United States Patent [19]

Mason

[11] Patent Number: 4,802,215

[45] Date of Patent: Jan. 31, 1989

[54] SECURITY SYSTEM FOR TELEVISION SIGNAL ENCRYPTION

[75] Inventor: Arthur G. Mason, Hampshire, United Kingdom

[73] Assignee: Independent Broadcasting Authority, London, England

[21] Appl. No.: 713,904

[22] PCT Filed: Jul. 2, 1984

[86] PCT No.: PCT/GB84/00236

§ 371 Date: Mar. 15, 1985

§ 102(e) Date: Mar. 15, 1985

[87] PCT Pub. No.: WO85/00718

PCT Pub. Date: Feb. 14, 1985

[30] Foreign Application Priority Data

Jul. 23, 1983 [GB] United Kingdom ................. 8319817

[51] Int. Cl.$^4$ ......................... H04L 9/04; H04N 7/167
[52] U.S. Cl. ....................................... 380/21; 380/20; 380/47
[58] Field of Search ................ 178/22.08, 22.09, 22.13, 178/22.17, 22.07; 358/114, 122, 118; 235/380; 380/20, 21, 23-25, 28, 43, 48, 44, 45, 47

[56] References Cited

U.S. PATENT DOCUMENTS

| | | | |
|---|---|---|---|
| 4,112,464 | 9/1978 | Guif et al. .............................. | 380/20 |
| 4,159,468 | 6/1979 | Barnes et al. ..................... | 178/22.07 |
| 4,193,131 | 3/1980 | Lennon et al. ..................... | 178/22.09 |
| 4,354,201 | 10/1982 | Sechet et al. ......................... | 358/122 |
| 4,358,672 | 11/1982 | Hyatt et al. .......................... | 235/380 |
| 4,388,643 | 6/1983 | Aminetzah ......................... | 178/22.13 |
| 4,450,481 | 5/1984 | Dickinson .......................... | 358/118 |
| 4,484,027 | 11/1984 | Lee et al. ......................... | 178/22.13 |
| 4,484,217 | 11/1984 | Block et al. ......................... | 358/122 |
| 4,531,021 | 7/1985 | Bluestein et al. .................... | 358/122 |
| 4,634,808 | 1/1987 | Moerder ............................... | 380/21 |
| 4,736,422 | 4/1988 | Mason ................................... | 380/20 |

Primary Examiner—Salvatore Cangialosi
Attorney, Agent, or Firm—Watson Cole Grindle & Watson

[57] ABSTRACT

A conditional access system for over-air transmission and reception of scrambled television signals improves the reliability of the reception by transmitting a key signal for use in descrambling the television signal in a block of information which is itself encyphered by the key signal. On reception, the receiver after decyphering of the block of information compares the key signal recovered from the block with the key signal provided at the receiver for decyphering the block. Descrambling will only be allowed if comparison shows the two key signals to be the same. The system also provides for information relating to the credit status of each user to be transmitted over-air. In order to ensure rapid operation, the credit status signal is sent repeatedly and a further signal is appended which is used at the receiver to prevent repeated accumulation of credit. An alternative arrangement is for the transmitter to transmit a signal indicative of the total sum of credit ever purchased by a user and for the user's receiver to include a counter for accumulating all charges for programs viewed. A simple comparison between the two signals is sufficient to establish whether or not the viewer may view a program.

21 Claims, 4 Drawing Sheets

SECURITY SYSTEM FOR TELEVISION SIGNAL ENCRYPTION

The present invention relates to a security system for television signal encryption, usable in the transmission and reception of television signals in either digital or sampled analogue form. In particular, the invention relates to such a security system which can provide an effective payment monitoring facility whereby relevant information can be transmitted, for example, in a satellite broadcasting channel. The invention may be used in the encryption of a multiplexed analogue component (MAC) television signal.

The present invention is a development of certain aspects of the system described in our co-pending application U.S. Ser. No. 317796, and reference is directed thereto.

PAY-PER-VIEW

Pay-per-view is a very important feature which all subscription television services should contain. Typically, the decision to watch a programme is made in the few minutes before a service is broadcast. This factor of human behaviour could be very important to the economics of providing a new type of public service broadcasting. If the customer has to decide well in advance which programmes he will watch the viewer will tend to make a conservative estimate for his entertainment budget. Pay-per-view can be offered quite simply by including a meter in the receiver. A payment is made by the viewer to the broadcaster who then transmits the payment to the customer's receiver in the form of 'electronic' over-air credit. The over-air credit is sent with the viewers validation signal and it is entered into the meter in his receiver. A money store is provided for each television channel and the store is decremented by a cost code which accompanies the television signal. In this way a viewer is able to gain immediate access to programmes and furthermore, he only pays for those programmes that he watches.

Over-air credit provides a convenient and economical means of transferring credit units into a store in the receiver. However, in order that the system operates securely certain facts have to be taken into account:

(i) how to make the transfer of credit units securely;
(ii) how to inform the receiver that it has already received a specified quantity of credit units when the same quantity is being repeatedly transmitted;
(iii) how to detect whether the data bits which represent the credit units have been received correctly in the presence of noise; and
(iv) how to prevent the missed reception of credit units, which are part of a standing order, when the customer leaves the receiver switched off for a time longer than the payment period (such as when the customer goes away on holiday).

The present invention is able to cope effectively with factors (i) to (iii). Factor (iv) is catered for provided a very large number of credit units are not missed.

Features and advantages of the invention will become apparent from the following description of a preferred embodiment thereof, given by way of example, and when taken in conjunction with the accompanying drawings, in which.

Figure 1:
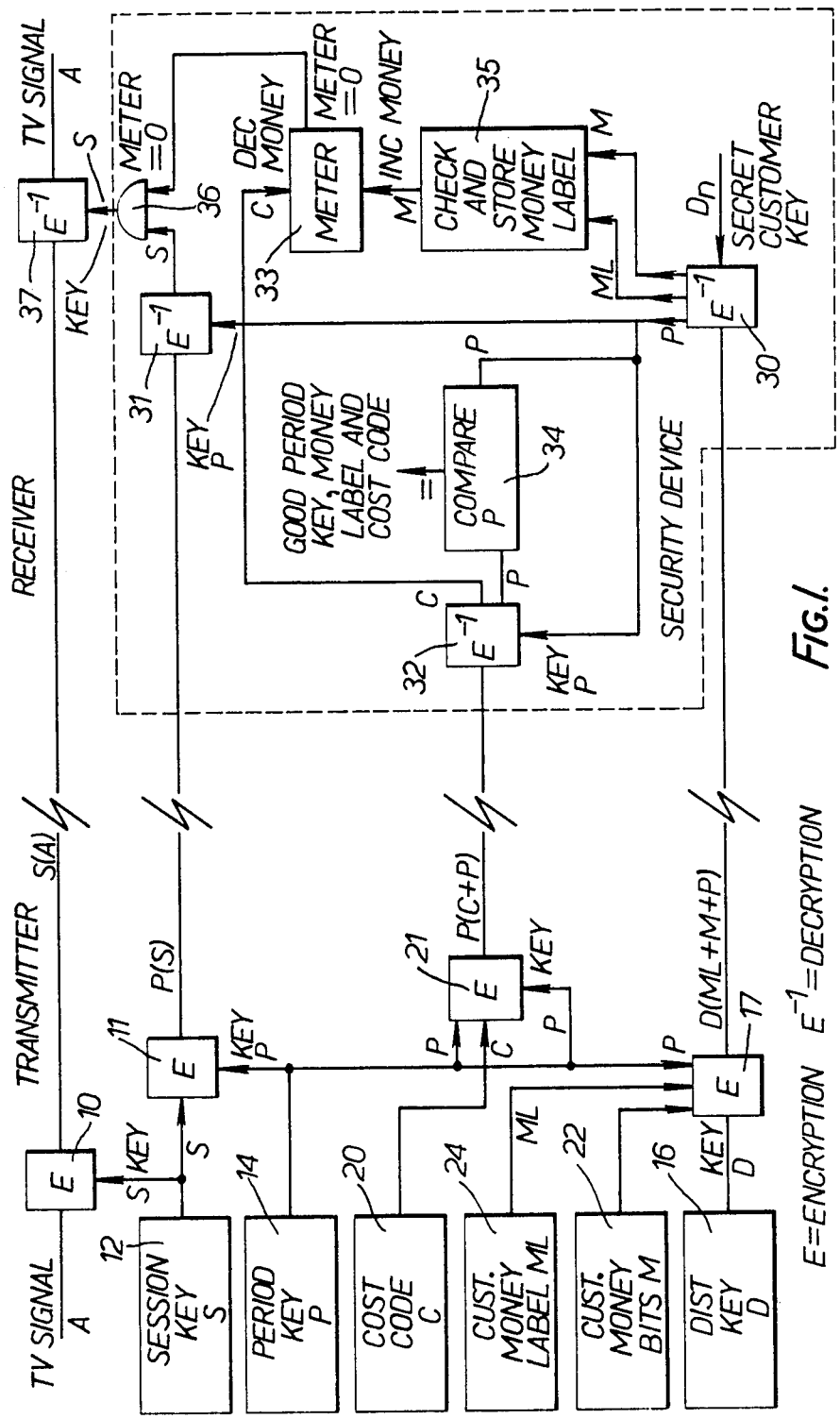
FIG. 1 shows a block diagram of the signal paths in a transmitter/receiver system in accordance with one embodiment of the invention.

The arrangement to be described, specifically with reference to FIG. 1, involves a technique by which over-air credit information may be sent securely under conditions of low signal-to-noise ratio, such as in a noisy satellite channel. A predetermined quantity of credit units (hereinafter referred to as "money") are sent to each customer per payment interval, encrypted in the transmitted signal, and entered in a meter in the receiver. The meter is decremented upon reception of a programme cost code in the transmitted signal. In this way, a full pay-per-view service can be made available to all categories of customer. The service can be organised on a pre-payment basis by transmitting appropriate credit units upon payment in advance by the customer.

In accordance with the preferred technique, the following steps must be made in order to transmit securely money to each receiver for entry in the meter. The techniques described may also be applied when the system is used for tiering or a basic subscription.

In FIG. 1, a television signal A is scrambled by an encryption key S prior to transmission in a scrambling circuit 10. For security reasons the key S hereinafter called the session key is itself encrypted in a second circuit 11 by a further key P hereinafter termed the period key and the encrypted session key P(S) is also transmitted. The session key S and the period key P are generated by key generator circuits 12 and 14 respectively and both keys are changed periodically but with the session key S being changed more frequently than the period key P.

Rather than directly transmitting the period key to a user so that he can use it to obtain the session key S and thus unscramble the television signal, it is proposed to generate in a circuit 16 an additional key called the distribution key D which will be made available to the user and to encrypt the period key P in a circuit 17 by the distribution key D prior to transmission. Thus far the arrangement is basically the same as that disclosed in our co-pending application U.S. Ser. No. 8317796. However, we propose to transmit information relating to the credit status of each user over air in addition to the scrambled signal and the various keys. To do this, a cost code generator circuit 20 generates a signal C indicative of the cost of each program and this signal is transmitted with the television signal. In order to prevent tampering with this signal at the receiving end, the signal C is encrypted prior to transmission and it is preferred to encrypt it with the period key P in an encryption circuit 21.

It is further proposed to transmit information M relating to the amount of credit held by each user and this is best achieved by generating the information M in a customer money circuit 22, adding it to the period key P in a manner to be described later and encrypting P+M with the distribution key D in the circuit 17. For reasons given later, a customer money label circuit 24 generates a money label ML which is also fed to the circuit 17 and is added to P+M to form P+M+ML and it is this block of information which is encrypted with the distribution key D and transmitted to the receiver.

At the receiver, the received signal D (P+M+ML) is fed to a decryption circuit 30 where the distribution key D, supplied to the user either in the form of a SMART card or a chip built into the user's receiver or in some other way, is used to decrypt P+M+ML. The period key P is used to decrypt the session key S in a decryption circuit 31 but is also supplied to a further decryption circuit 32 in order to recover the cost code C which is used to decrement a counter 33 which is used as a meter.

As will be explained in more detail later, the cost code C has added to it prior to transmission a further predetermined code which when received is checked in order to determine whether or not the transmission has been successful. It is preferred to use the period key P itself as the code and thus at the receiver, the circuit 33 recovers both the cost code C and the period key P which is checked in a comparison circuit 34 with the period key recovered in the circuit 30 from the received signal D(P+M+ML).

It will be recalled that credit information is included in the signal D(P+M+ML) and the circuit 30 recovers the money information M as well as the money label M. The money label ML is stored in a circuit 35 while the money information M is used to increment the counter 33. Should the counter read zero, an inhibit signal is produced by the counter 33 which is fed to a gate circuit 36 to prevent the session key S from being applied to a descrambling circuit 37 which is used to decramble to scrambled television signal.

OVER-AIR CREDIT INFORMATION

Money which is sent over-air cannot simply be encrypted with a key K in the form K(MONEY). This is very insecure since the message MONEY is not unique. Let us assume that MONEY is a code which represents a monotonically increasing amount of transmitted money. Supposing the broadcaster sent the digital code all zeros, to represent a transmission of zero credit to a customer. Encrypting this information with the key K produces some bit pattern for K(MONEY). An unauthorised user (pirate) can simply add money to his receiver without knowledge of the key K by simply altering the bit pattern of K(MONEY). When the receiver decrypts the new message with the secret key K a new plain text message is produced which must be non-zero. This is because there only exists a one-to-one mapping of the cipher text into the plain text. Since the original cipher text message meant 'zero money', changing the cipher text message must produce a code which indicates that a non-zero amount of money has been transmitted. Hence a pirate has added money to his receiver, although he does not know the amount.

The way to overcome this problem is to append a key to the money. The receiver will then only accept the money signal provided it has found the correct appended key. This is achieved by sending the signal D(M+P), where D is the distribution key, M the money and P the period key. Reference is directed to the aforementioned application U.S. Ser. No. 8317796 for more details of this. Clearly, if the receiver is to validate the money bits (M) with the period key (P) it must be sure that the period key has been received correctly. This can be achieved by the signal P(X+CODE), where x conveys some other information which is not unique, such as cost codes and date information.

The signal CODE is a large number of bits and unique. The signal CODE is best made equal to the value of the period key. This gives greater security since the period key is a signal that changes with time and is kept secret. This idea uses the fact that there is an extremely good chance that the correct period key has been received if the signal P(X+P) can be decrypted with said received period key to yield the same decryption key—i.e. the period key P.

Furthermore, in the same way that the period key P was used to check that the money bits M were correct in the signal PD(M+P), the period key P is also used to check that the message X is correct. Hence the value of X may be made equal to any plain text message. A typical signal that requires protection is the programme cost code (C). Hence the signal P(C+P) which is shown in FIG. 1 is used to check that the cost code (C), the period key (P) have all been received correctly. Since the period key (P) is known to have been received correctly the money bits (M) in the signal D(M+P) are also checked correctly. A further refinement is to combine the signals P(S) and P(C+P) to form the signal P(C+S+P), this then allows the period key to check that the session key (S) has been received correctly as well.

PROGRAMME CHARGING METHODS

There are two methods of decrementing the receiver's meter in order to pay for programmes. The first method causes small credits to be consumed during every 10 second period of the programme. The second method causes an amount equivalent to the total programme price to be consumed when the decision to receive that programme is made by the customer. In order to prevent multiple payment for the same programme a number is given to each programme and this programme number is stored in the receiver when the credit is consumed. Retransmissions of the same programme may be made with either the same or a different programme number depending upon whether an additional charge is to be made for further receptions of the same programme item. There are 256 programme numbers which repeat after one month; a date stamp keeps a record of the month and may also be used to record when payment was made for the programme. All of the above information which will be called x, and is sent encrypted with the period key P in the manner previously described as P(x+P). The period key performing the dual role of both encrypting the information and performing a check on the correct reception of the information.

SECURITY

Figure 2:
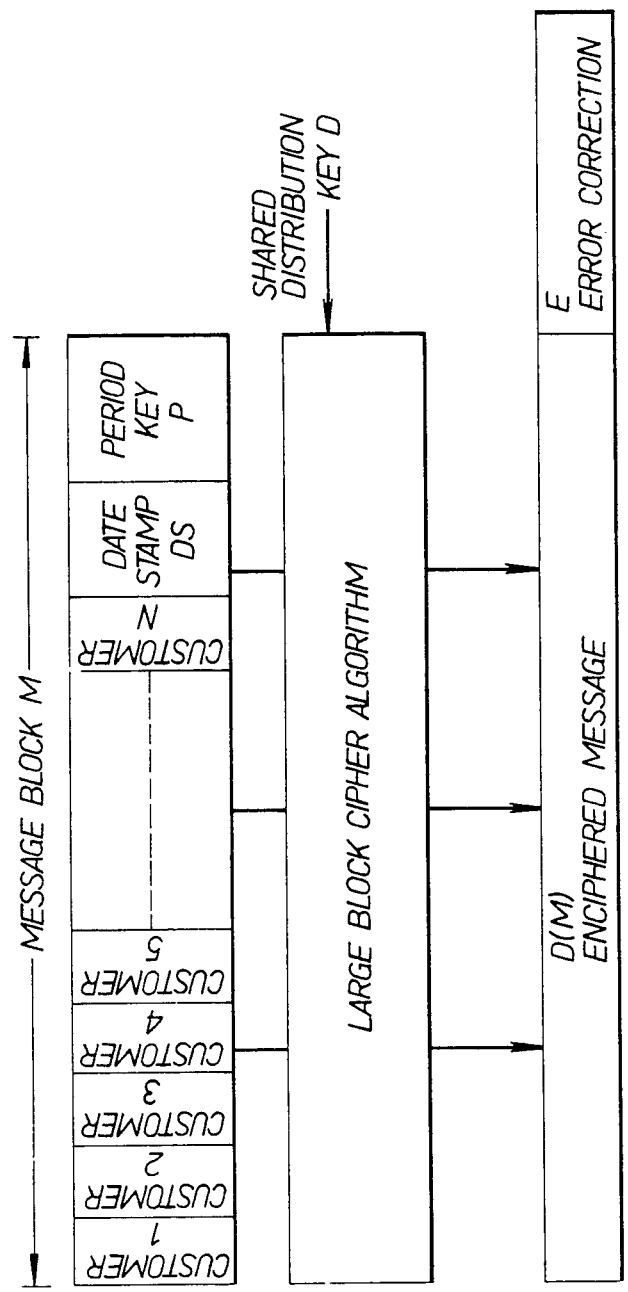
FIG. 2 is a diagram for explaining the statistics for validation of non-unique information.

It is assumed that the pirate cannot obtain his distribution key (D). He can only obtain the distribution key by breaking into his set, in which case he would be able to obtain free television anyway. Therefore, his only method of attack, assuming he cannot break the encryption algorithm, is to alter the cipher text D(M+P) in order to obtain a valid period key with a different code for the money (M). The statistical discussion below with reference to FIG. 2 shows that the probability of being able to change the money bits (M) but still retain the same period key (P) is given by:

$$p = \frac{2^{n-m} - 1}{2^n - 1} \quad \text{(i)}$$

where $n$ = no. of cipher text bits and
$m$ = no. of period key bits for $n \geq m$
in the case when $n - m >> 1$ then equation (i) becomes $$p \simeq \frac{1}{2^m} \quad \text{(ii)}$$

The same theory applies to other essential signals that are coded in this form. Furthermore, the same principles apply whether the cipher text is altered by a pirate or erroneously received from the satellite.

Referring to FIG. 2, the encryption process provides a one-to-one mapping between n cipher text bits and n plain text bits. The customer bits are only valid provided that the correct period key (P) has been received. This protocol needs to be adopted since each combination of the customer bits contains a valid message. Since there are only m bits assigned to the period key, $m<n$. There will be, in general, several mappings of the cipher text block into the same period key. This will result in a different, but valid, customer word having a valid period key. A pirate may try to alter his customer bits; in order to gain money for example. He does not know the key (K), but let us assume that he tries to alter the cipher text in order to 'fool' the decoder into producing the same period key with a different customer word. In order to effect this process he tries many cipher text combinations. If the number of combinations that he has to try is made impossibly large, he will have negligible probability of producing his wanted result.

There are a total of $2^n$ combinations of n cipher text bits. One of these combinations, the one sent to the pirate, is of no interest. Hence there are a total of $2^n-1$ *alternative* combinations which *might* yield the desired result of leaving the m bit period key unaltered.

Now assuming each mapping is equally likely, the probability of finding an *alternative* combination which leaves the period key unaltered is given by:

$$p = \frac{n_1}{n_2}$$

wherein $n_1$ = number of alternative mappings of cipher text into plain text leaving period key unaltered, and $n_2$ = total number of alternative mappings of cipher text into plain text.

There are a total of $2^n$ mappings of the cipher text into the plain text. There are a total of $2^{n-m}$ mappings that leave m bits unaltered, $n>m$. Since one of these mappings is of no interest there are a total of $2^{n-m}-1$ *alternative* mappings which produce an unchanged m bit period key.

Therefore, $$p = \frac{2^{n-m} - 1}{2^n - 1} ; n > m$$

now for $m=0$, $p=1$; as expected since the message is not protected with the period key in this case.

for $n=m$, $p=0$; as expected since there exists only a one-to-one mapping of cipher text into plain text.

for $n-m>1$; n and m being positive integers, $p=1/2^m$; this is the usual case to consider.

In this case, a period key of 56 bits yields $p=1/2^{56}$ $1.4 \times 10^{-17}$ i.e. there is a negligible probability of the event happening.

Figure 3A:
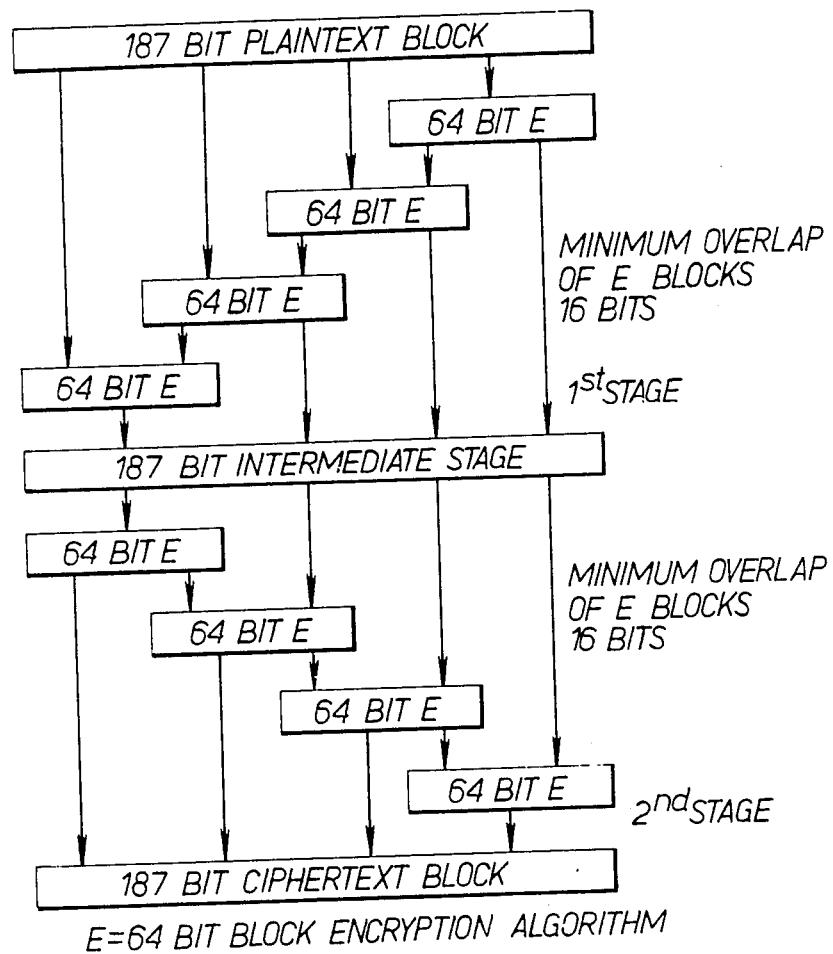
FIGS. 3a and 3b show a technique for producing cipher text that has certain properties which are desirable in the invention.

For the methods described herein, it is essential that the shared message block is adequately encrypted. A stream cipher cannot be used since both the magnitude *and* the position of the plain text information must be destroyed. A block or feedback cipher should be used and must have the following property. If one bit of the cipher text is altered, a number of bits of the plain text will be altered, under the same key, and these altered bits will be evenly distributed over the plain text message. FIG. 3a shows schematically how long blocks may be ciphered using a number of 64 bit sub-blocks. Each sub-block is a 64 bit block cipher.

Figure 3B:
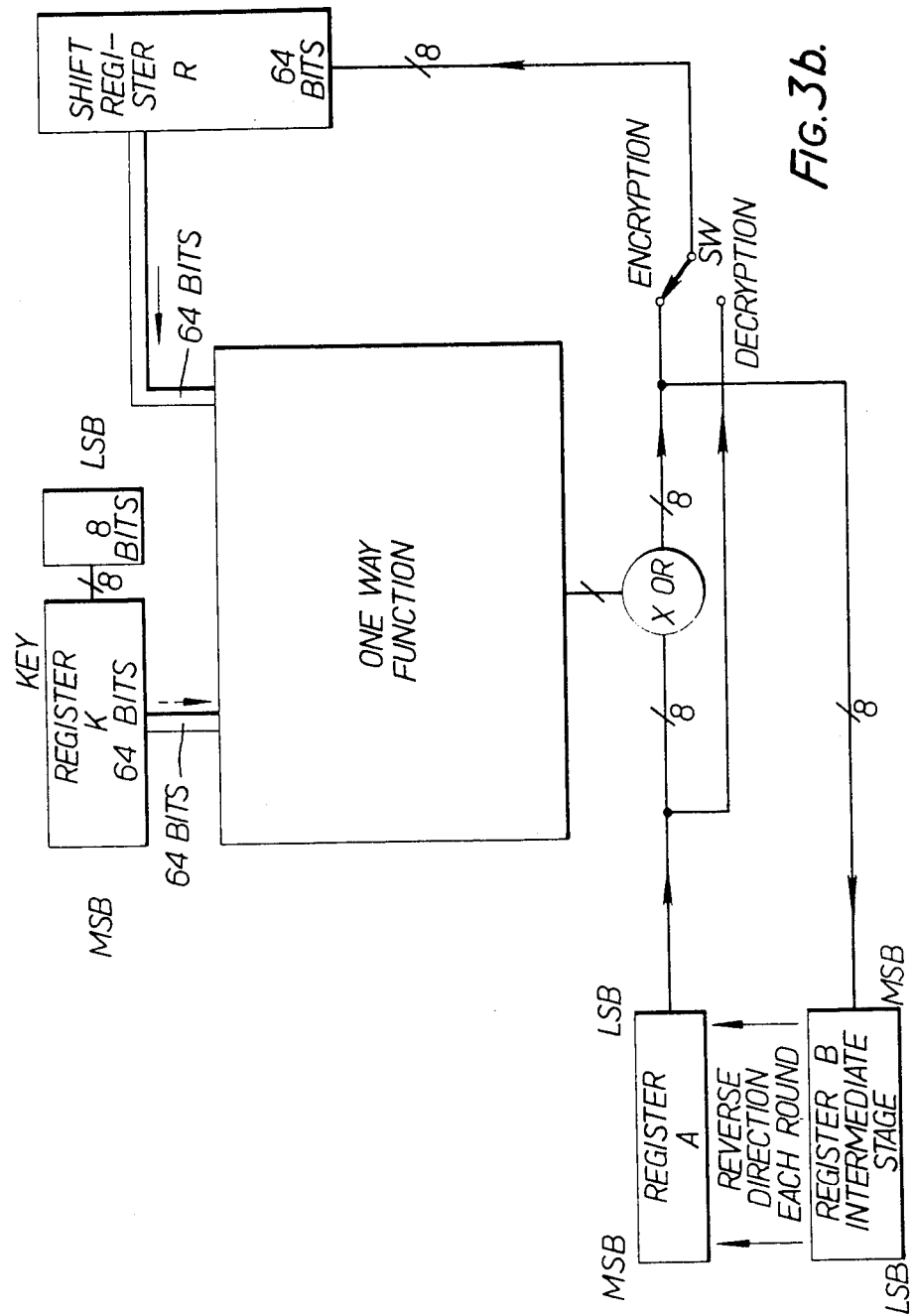

The essential feature is to overlap the sub-blocks and form an intermediate stage. The final cipher text block is guaranteed to have the properties described above by *reversing* the direction in which the sub-blocks are overlapped during the second stage. The same technique of forming an intermediate stage and reversing the direction in which the algorithm is performed for the second stage can be applied to cipher fed back in order to achieve the necessary cipher text properties. Cipher feedback is a well known technique and the technique of reciphering the cipher text in the reverse direction is shown in FIG. 3b.

MONEY LABEL

The transmission of the money must be accompanied by a date stamp or money label. A money label is just a date stamp of limited length. The money label (ML) is used to ensure that the money is only entered into the meter once during a payment period. This is required because the monetary information is repeated several times during the course of a payment interval. After the money has been entered along with the label further receptions of more money, having the same money label are inhibited; this is shown in FIG. 1. The money label (ML) takes the form of a two bit number which is appended to each individual customer's money bits (M). Hence the money labels appropriate to individual customers will change at different rates.

In practice a date stamp also needs to be included in the plain text message to prevent fraudulent replays of old cipher text. However, for the sake of clarity this is not shown in any of the Figures.

An alternative and possibly better method of preventing the receiver from continuously entering the same payment, which does not involve the use of money labels, is as follows. Instead of sending the new payment increment, the total sum of all payments ever sent to the broadcaster is transmitted over-air. The security device then merely subtracts the previously stored payment from the transmitted payment in order to find the actual payment. This method has the advantage that the rate of making payments to the broadcaster does not need to be kept in step with the rate of receiving over-air credit tokens. However, the method would normally require many bits to be used for the payment and this would dramatically increase the validation cycle time. A slight refinement to the principle overcomes the problem of the long cycle time and this is as follows. The total sum of all payments ever made is still sent—but in modulo 256 form; hence only eight bits are required. Since the total sum can only increase, and fraudulent replays of old payments are prevented by means of the date stamp, the following algorithm can be used. If the transmitted sum is greater than the stored sum the difference is taken as before. However, if the transmitted sum is less than the stored sum an overflow must have occurred and 256 is added to the difference calculations. The technique assumes that no more than one overflow will occur. This can be safely assumed if the monetary value of 256 tokens is extremely large. Furthermore, the stored total sum value represents a useful compact means of representing received over-air credit payments in the case of a dispute. Clearly the same principal applies to any modulus and 256 is only given by way of example.

The above described embodiment discloses two major features in combination namely the use of the period key to encrypt a signal containing the period key in order to check correct transmission and reception and the use of a money label which is transmitted with the money signal in order to prevent multiple accumulations of the money signal. Although this latter feature is not claimed in independent form in the following claims, the applicants reserve the right to file at a later date such claims as they consider appropriate to this feature.

I claim:

1. Apparatus for securely transmitting a scrambled information signal to a receiver, comprising:
   means for scrambling an input information signal;
   means for transmitting the scrambled information signal;
   means for generating a first encryption key required at said receiver to enable descrambling of said transmitted scrambled information signal;
   means for generating a second encryption key indicative of an authorized receiver;
   means for forming a first block of information including the first encryption key;
   first encryption means for encrypting the first block of information using the second encryption key to provide a first encrypted signal;
   means for forming a second block of information including the first encryption key;
   second encryption means for encrypting the second block of information using the first encryption key to provide a second encrypted signal; and
   means for transmitting the first and second encrypted signals with the transmitted scrambled information signal to enable detection in said receiver of transmission errors in the keys.

2. Apparatus according to claim 1, and further comprising means for generating information for transmission with the scrambled information signal, and wherein one of the means for forming a first block of information and the means for forming a second block of information is arranged to include the information in the block of information formed thereby to enable detection in said receiver of transmission errors or tampering with the information.

3. Apparatus according to claim 2, and further comprising means for generating further information for transmission with the scrambled information signal, and wherein one of the means for forming a block of information includes the information in the block formed thereby and the other of the means for forming a block of information includes the further information in the block formed thereby to enable detection in said receiver of transmission errors or tampering with the information or the further information.

4. Apparatus according to claim 2, wherein the means for generating information generates a signal indicative of the cost to a receiver of the information signal.

5. Apparatus according to claim 3, wherein the means for generating information generates a signal indicative of the cost to said receiver of the information signal, the means for generating further information generates a signal indicative of the credit status of a receiver and the means for forming a first block of information includes the credit status signal in the first block of information.

6. Apparatus according to claim 5, wherein the means for transmitting the first and second encrypted signals repeatedly transmits the first encrypted signal, and further comprising means for generating a label signal, and the means for forming a first block of information includes the label signal in the first block of information.

7. Apparatus according to claim 6, wherein the means for generating a label signal also generates a signal indicative of a date and/or time associated with the credit status signal.

8. Apparatus according to claim 5, wherein the means for generating further information generates a signal indicative of the total sum of credit of said receiver for which payment has been made.

9. Apparatus according to claim 5, wherein the means for generating further information also generates a signal indicative of the credit status of said receiver in modulo m form.

10. Apparatus according to claim 1, wherein the means for transmitting the scrambled information signal and the means for transmitting the first and second encrypted signals broadcast said signals.

11. Apparatus according to claim 1, further comprising means for generating a third encryption key, further encryption means for encrypting the third encryption key using the first encryption key to provide a third encrypted signal, and means for transmitting the third encrypted signal, and the scrambling means scrambles the input information signal under the control of said third encryption key.

12. Apparatus according to claim 1, further comprising means for generating a third encryption key, and wherein the means for forming a second block of information includes the third encryption key in the second block of information, thereby enabling detection in a receiver of transmission errors in the third encryption key, and the scrambling means scrambles the input information signal under the control of the third encryption key.

13. Apparatus for receiving a scrambled information signal and for descrambling the scrambled information signal in response to detection that a first encryption key required to enable descrambling has been correctly received, comprising:
   means for receiving a scrambled information signal;
   storage means for storing a second encryption key;
   means for receiving a second signal comprising a first block of information, including a first encryption key, encrypted by the second encryption key;
   first decryption means for decrypting the second signal using the stored second encryption key to recover the first encryption key from the first block of information;
   means for receiving a third signal comprising a second block of information, including the first encryption key, encrypted by the first encryption key;
   second decryption means for decrypting the third signal using the first encryption key recovered from the first block of information to recover the first encryption key from the second block of information;
   comparison means for comparing the first encryption key recovered from the first block of information with the first encryption key recovered from the second block of information to detect transmission errors; and means for descrambling the received scrambled information signal enabled by correct reception of a first encryption key.

14. Apparatus according to claim 13, wherein one of the means for receiving a second signal and the means for receiving a third signal receives a signal comprising an encrypted block of information including information.

15. Apparatus according to claim 13, wherein the means for receiving a second signal receives a signal comprising an encrypted first block of information including information and the means for receiving a third signal receives an encrypted second block of information including further information.

16. Apparatus according to claim 14, wherein the means for receiving a third signal receives an encrypted second block of information including information indicative of the cost of the scrambled information and the second decryption means recovers the cost signal, and further comprising storage means, and the second decryption means outputs the recovered cost signal to said storage means to alter the contents thereof.

17. Apparatus according to claim 15, wherein the means for receiving a second signal receives an encrypted first block of information including information indicative of the credit status of the receiver, the means for receiving a third signal receives an encrypted second block of information including further information indicative of the cost of the scrambled information, the first decryption means recovers the credit status signal, the second decryption means recovers the cost signal, and further comprising storage means, and wherein the first and second decryption means output the recovered credit status signal and the recovered cost signal to said storage means to alter the contents thereof.

18. Apparatus according to claim 17, wherein the storage means outputs a disabling signal to the descrambling means when the stored contents have a predetermined value.

19. Apparatus according to claim 17, wherein the block of information contains an inhibiting signal and the first decryption means recovers the inhibiting signal, and further comprising an inhibiting circuit responsive to the inhibiting signal to inhibit the altering of information in said storage means in response to a further reception of an encrypted first block of information including the credit signal added to the same inhibiting signal.

20. Apparatus according to claim 17, wherein the first block of information contains a signal indicative of the total sum of credit associated with a respective receiver and the first decryption means recovers the total sum of credit signal, and further comprising means for comparing the existing total sum of credit with the current credit sum and controlling operation of the apparatus as a result of said comparison.

21. Apparatus according to claim 13, and further comprising means for receiving a fourth signal comprising a third encryption key encrypted by the first encryption key, third decryption means for decrypting the fourth signal using the first encryption key recovered from the first block of information and for applying the recovered third encryption key to the descrambling means to control descrambling of the scrambled information signal.

* * * * *